US 9,327,809 B2

(12) United States Patent
Shinkai et al.

(10) Patent No.: US 9,327,809 B2
(45) Date of Patent: May 3, 2016

(54) SALVAGE CONTAINER AND SALVAGING METHOD

(75) Inventors: Atsushi Shinkai, Hyogo (JP); Kiyoshi Asahina, Hyogo (JP); Kenji Tamai, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 185 days.

(21) Appl. No.: 14/005,248

(22) PCT Filed: Mar. 5, 2012

(86) PCT No.: PCT/JP2012/001497
§ 371 (c)(1),
(2), (4) Date: Sep. 13, 2013

(87) PCT Pub. No.: WO2012/124285
PCT Pub. Date: Sep. 20, 2012

(65) Prior Publication Data
US 2013/0340662 A1 Dec. 26, 2013

(30) Foreign Application Priority Data
Mar. 15, 2011 (JP) ................................ 2011-056143

(51) Int. Cl.
*B63C 7/00* (2006.01)
*B63C 11/52* (2006.01)
(Continued)

(52) U.S. Cl.
CPC .................. *B63C 11/52* (2013.01); *B63B 27/36* (2013.01); *B63C 7/00* (2013.01); *F16J 13/04* (2013.01); *F16J 13/10* (2013.01)

(58) Field of Classification Search
CPC .................................. B63C 7/00; B63C 11/52
See application file for complete search history.

(56) References Cited

U.S. PATENT DOCUMENTS 2,335,309 A * 11/1943 Pfleumer ....................... 220/251
2,396,469 A    3/1946 Meigs
(Continued)

FOREIGN PATENT DOCUMENTS

DE    4205867 A1    9/1992
JP    05-071150 U   9/1993
(Continued)

OTHER PUBLICATIONS

International Search Report; PCT/JP2012/001497; Jun. 12, 2012.
(Continued)

*Primary Examiner* — Edwin Swinehart
(74) *Attorney, Agent, or Firm* — Studebaker & Brackett PC

(57) ABSTRACT

Provided are a salvage container and a salvaging method capable of salvaging ammunition dumped into the sea using a simple configuration while more reliably suppressing the leakage of a chemical agent from the ammunition. A salvage container includes: a container body (30); a lid (40) that blocks an opening portion of the container body (30); a gasket (70) that is formed of a compressively deformable member and that blocks a gap between an inner side surface (33) of the container body (30) and the lid (40) from the outer side in a specific direction; and a gasket presser (50) that clamps the gasket (70) between the gasket presser (50) and the lid (40). The container body (30) includes: a lid holder (33b) that holds the lid (40) so that the lid (40) is displaced toward the outer side in the specific direction in relation to the container body (30); and a gasket presser holder (34b) that holds the gasket presser (50) so that the lid (40) is displaced toward the outer side in the specific direction in relation to the gasket presser (50) according to a decrease in the hydraulic pressure. The gasket (70) is compressively deformed by the relative displacement of the lid (40) so that the gap between the inner side surface (33) of the container body (30) and the lid (40) is hermetically sealed.

12 Claims, 10 Drawing Sheets

(51) Int. Cl.
  *B63B 27/36* (2006.01)
  *F16J 13/04* (2006.01)
  *F16J 13/10* (2006.01)

(56) References Cited

U.S. PATENT DOCUMENTS

| | | |
|---|---|---|
| 2,919,048 A | 12/1959 | Harvey |
| 3,419,180 A | 12/1968 | Homrig et al. |
| 4,055,247 A * | 10/1977 | Benedick et al. ............ 206/3 |
| 4,279,356 A * | 7/1981 | Amorese et al. ............ 220/314 |
| 4,396,095 A | 8/1983 | Wernli et al. |

FOREIGN PATENT DOCUMENTS

| | | |
|---|---|---|
| JP | 2002-145186 A | 5/2002 |
| JP | 2004-123086 A | 4/2004 |

OTHER PUBLICATIONS

Written Opinion of the International Searching Authority; PCT/JP2012/001497; Jun. 12, 2012.

The extended European search report issued by the European Patent Office on Dec. 8, 2015, which correspond to European Patent Application No. 12757624.7-1751 and is related to U.S. Appl. No. 14/005,248.

\* cited by examiner

SALVAGE CONTAINER AND SALVAGING METHOD

TECHNICAL FIELD

The present invention relates to a salvage container and a salvaging method for salvaging ammunition dumped into the sea or the like.

BACKGROUND ART

There is a demand for recovering military ammunition or the like dumped and left in the sea or the like from the perspective of environment or the like.

As a method of salvaging waste dumped into the sea or the like, a method of pulling the waste out on a ship using a crane installed on the ship is known, for example, as disclosed in Patent Document 1.

CITATION LIST

Patent Document

Patent Document 1: JP 2002•145 186 A

SUMMARY OF THE INVENTION

Some military ammunition contains a chemical agent inside their bullet shell. When ammunition dumped into the sea contains a chemical agent, there is a concern that the chemical agent may leak into the sea or the atmosphere from the ammunition during the salvage.

The present invention has been made in view of the problems described above and an object thereof is to provide a salvage container and a salvaging method capable of salvaging ammunition dumped into the sea using a simple configuration while more reliably suppressing the leakage of a chemical agent from the ammunition.

In order to solve the above problems, the present invention provides a salvage container for salvaging ammunition in the water on the water, including: a container body that has a bottomed cylindrical shape that is open in a specific direction so that the ammunition is inserted therein and that has an inner side surface surrounding the ammunition inserted therein; a lid that is disposed in a region surrounded by the inner side surface of the container body so as to block an opening portion of the container body; a gasket that is disposed in the region surrounded by the inner side surface of the container body so as to block a gap between the inner side surface of the container body and the lid from the outer side in the specific direction of the lid; and a gasket presser that is disposed at the outer side in the specific direction of the gasket so as to clamp the gasket between the lid and the gasket presser, wherein: the container body includes a lid holder that holds the lid and a gasket presser holder that holds the gasket presser, the lid holder holds the lid so that the lid is not displaced toward the inner side in the specific direction in relation to the container body and is displaced toward the outer side in the specific direction, the gasket presser holder holds the gasket presser so that, when the lid is displaced toward the outer side in the specific direction in relation to the container body according to a decrease in hydraulic pressure, the amount of relative displacement at the outer side in the specific direction of the gasket presser in relation to the container body is smaller than the amount of relative displacement at the outer side in the specific direction of the lid in relation to the container body whereby the lid is displaced toward the outer side in the specific direction in relation to the gasket presser, and the gasket is configured to be compressively deformed between the lid and the gasket presser when the lid is displaced toward the outer side in the specific direction in relation to the gasket presser, and hermetically seals the gap between the inner side surface of the container body and the lid by making close contact with the inner side surface of the container body and the lid according to the compressive deformation.

According to the present invention, the gap between the inner side surface of the container body and the lid is hermetically sealed by the compressive deformation of the gasket. As a result, ammunition is salvaged in the hermetically sealed state, and the leakage of a chemical agent in the ammunition into the water or the atmosphere can be suppressed in a more reliable manner. In particular, the lid is displaced toward the outer side in the specific direction in relation to the gasket presser according to a decrease in the hydraulic pressure, whereby the gasket is compressively deformed. Thus, it is possible to suppress the amount of compressive deformation of the gasket to be small at the point in time when the ammunition is accommodated in the salvage container. As a result, it is possible to eliminate an operation of compressively deforming the gasket in the water or to suppress the workload thereof to be small.

DESCRIPTION OF EMBODIMENTS

Hereinafter, a first embodiment of a salvage container and a salvaging method according to the present invention will be described with reference to the drawings.

Figure 16:
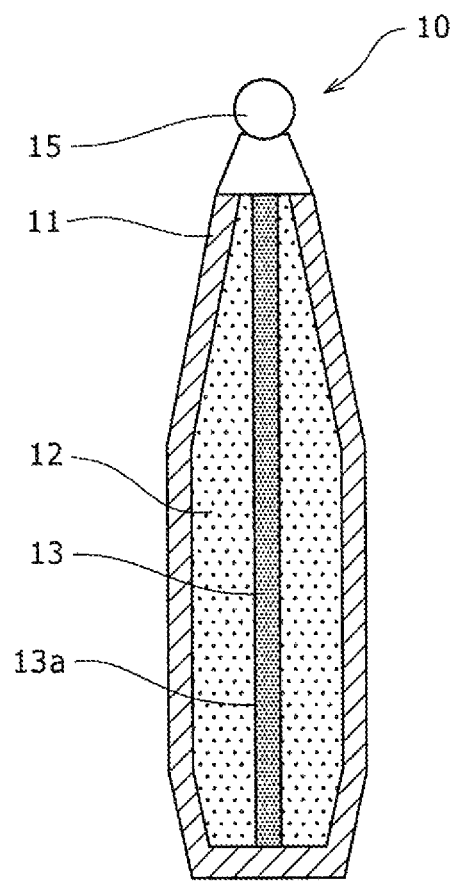
FIG. 16 is a cross-sectional view illustrating an example of chemical ammunition to which the present invention is applied.

FIG. 16 is a vertical cross-sectional view illustrating chemical ammunition 10 which is an example of ammunition that is accommodated in a salvage container according to the present invention and that is salvaged using a salvaging method according to the present invention. The salvage container and salvaging method according to the present invention are a container and a method for salvaging ammunition as illustrated in FIG. 16, which has been dumped and left in the water such as the deep sea, on the land.

The chemical ammunition 10 includes a hollow bullet shell 11 that extends in a predetermined direction, a steel burster cylinder 13a accommodated inside the bullet shell 11, a burster 13 accommodated in the burster cylinder 13a, a chemical agent 12 accommodated inside the bullet shell 11, and a fuse 15 fixed to a front end portion in the longitudinal direction of the bullet shell 11. The chemical agent 12 is highly likely to give adverse effect on a human body or the like. Thus, it is necessary to prevent the chemical agent 12 from leaking into the water or the atmosphere during the salvage.

The structure of the salvage container 20 according to the first embodiment will be described with reference to FIGS. 1 to 9.

The salvage container 20 includes a container body 30, a lid 40, a gasket presser 50, a handle (pressing member) 60, a self-sealing gasket (gasket) 70, and an O-ring 80. The salvage container 20 has sufficient pressure resistance so that it can be used in the deep sea. For example, the salvage container 20 has pressure resistance of 1.5 MPa so as to withstand an operation in the water at a depth of 150 m.

The chemical ammunition 10 is inserted in the container body 30. The container body 30 has a bottomed cylindrical shape that extends in a specific direction. The container body 30 has an opening portion that is open in the specific direction. The container body 30 has an inner side surface 33 that surrounds the chemical ammunition 10 inserted therein and an outer side surface 34 that extends in parallel to the inner side surface 33. In the first embodiment, the container body 30 has an approximately bottomed cylindrical shape. The container body 30 can be self-supported with a bottom portion 31 as a bottom surface. The container body 30 is installed on the bottom of sea in such an attitude that it is open upward. In the following description, the specific direction (that is, the axial direction of the container body 30) will be referred to as a vertical direction, a side closer to an opening portion 32 of the container body 30 (that is, the outer side in the specific direction) will be referred to as an upper side, and a side closer to the bottom portion 31 (that is, the inner side in the specific direction) will be referred to as a lower side. Moreover, an inner side in a radial direction about an axis of the container body 30 perpendicular to the vertical direction (that is, the inner side (container body inside) of the container body 30) will be referred to simply as an inner side, and an outer side in the radial direction (that is, the outer side (container body outside) of the container body 30) will be referred to simply as an outer side.

Figure 4:
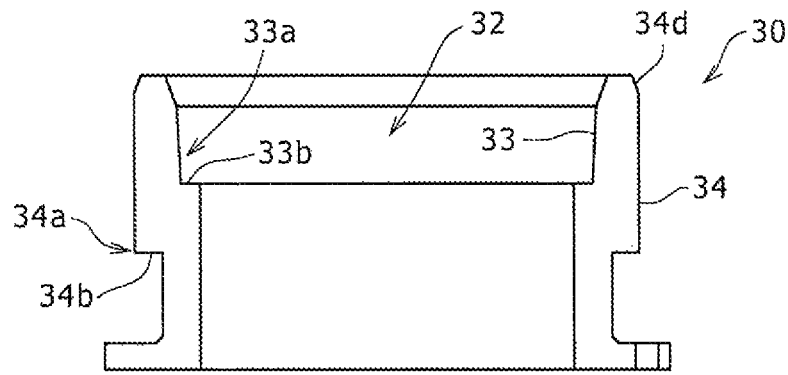
FIG. 4 is a cross-sectional view of a portion of a container body of the salvage container illustrated in FIG. 1.

As illustrated in FIG. 4, a step portion 33a that protrudes outward toward the upper side is formed on the inner side surface 33 near the upper end of the container body 30 over the entire circumference of the inner side surface 33. Due to the step portion 33a, a lid holding surface (lid holder) 33b that extends in a direction perpendicular to the vertical direction is formed near the upper end of the container body 30. The lid holding surface 33b restricts the lid 40 from moving downward to hold the lid 40.

A step portion 34a that is recessed inward toward the lower side is formed on the outer side surface 34 near the upper end of the container body 30 over the entire circumference of the outer side surface 34. Due to the step portion 34a, a claw clamping surface (gasket presser holder) 34b that extends in a direction perpendicular to the vertical direction is formed near the upper end of the outer side surface 34 of the container body 30.

In the first embodiment, the container body 30 includes an upper flange 30a that constitutes the upper part of the container body 30, a body 30b that is the lower part of the container body 30 and constitutes a main part of the container body 30, and a bottom plate 31 that constitutes the bottom portion of the container body 30. These upper flange 30a, body 30b, and bottom plate 31 are configured as separate parts and are fastened by bolts or the like. In the first embodiment, the body 30b is formed of FRP having relatively small specific gravity so that kinetic energy of broken pieces of the body 30b decreases when the chemical ammunition 10 or the like accommodated inside the body 30b is exploded and so that pressure resistance is secured. On the other hand, the upper flange 30a and the bottom plate 31 are formed of stainless steel.

Figure 5:
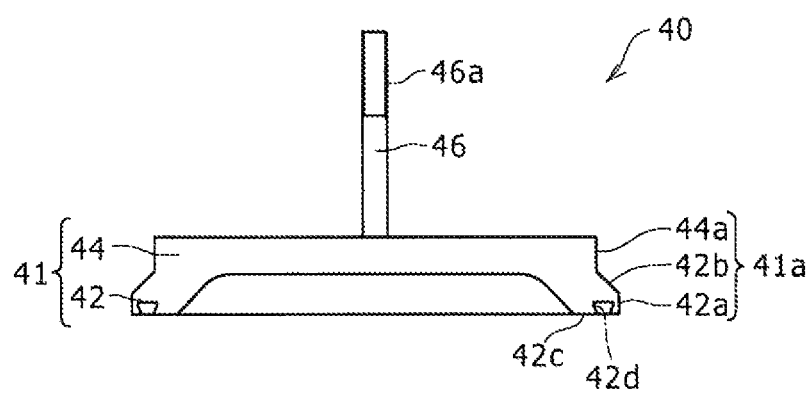
FIG. 5 is a cross-sectional view of a lid of the salvage container illustrated in FIG. 1.

The lid 40 blocks the opening portion 32 of the container body 30. As illustrated in FIG. 5, the lid 40 includes a lid body 41 that blocks the opening portion 32 of the container body 30 and a fixing member 46. The lid body 41 has a disk shape. The fixing member 46 protrudes upward from the lid body 41.

The outer diameter of the lid body 41 is set to be approximately the same as the inner diameter of a portion of the container body 30 located on the upper side than the lid holding surface 33b and is larger than the inner diameter of a portion of the container body 30 located on the lower side than the lid holding surface 33b. The lid body 41 is mounted on the lid holding surface 33b by being inserted inside the container body 30 from the upper side of the container body 30 (that is, in a region surrounded by the inner side surface 33 of the container body 30). The lid body 41 blocks the opening portion 32 of the container body 30 in a state of being mounted on the lid holding surface 33b (hereinafter this state will be appropriately referred to as a lid mounting state).

The lid body 41 includes an outer side surface 41a that extends in the vertical direction and faces the inner side surface 33 of the container body 30 over the entire circumference in the lid mounting state. A step portion that is recessed upward toward the inner side of the container body 30 is formed on the outer side surface 41a of the lid body 41.

The lid body 41 includes an upper portion (front portion) 44 on the upper side than the step portion and a bottom portion 42 on the lower side than the step portion.

The bottom portion 42 of the lid body 41 includes an outer side surface 42a that extends in the vertical direction and faces the inner side surface 33 of the container body 30 over the entire circumference and an upper surface (outer surface) 42b that extends toward the inner side from the upper end (the outer end in the specific direction) of the outer side surface 42a. In the first embodiment, the upper surface 42b of the bottom portion 42 is inclined inward as it advances upward.

The upper portion 44 of the lid body 41 includes an outer side surface 44a that extends upward from the inner end of the upper surface 42b of the bottom portion 42 of the lid body 41 and faces the inner side surface 33 of the container body 30 over the entire circumference. The outer side surface 44a of the upper portion 44 of the lid body 41 is shifted toward the inner side more than the outer side surface 42a of the bottom portion 42 of the lid body 41.

In the lid mounting state, a portion of a bottom surface 42c of the bottom portion 42 of the lid body 41 is in contact with the lid holding surface 33b. A groove 42d that is recessed upward over the entire circumference is formed in the portion of the bottom surface 42c of the lid body 41 making contact with the lid holding surface 33b.

The fixing member 46 protrudes upward from the center of the upper surface of the lid body 41. A screw that screws with the handle 60 is mounted on the fixing member 46. The upper end of a screw portion 46a of the fixing member 46 is configured to screw with a suspended ring 90. A rope or the like is inserted into the suspended ring 90 when the salvage container 20 is lifted.

The self-sealing gasket 70 blocks the gap between the lid 40 and the inner side surface 33 of the container body 30 from the upper side in the lid mounting state. In the first embodiment, the self-sealing gasket 70 has a ring shape. The self-sealing gasket 70 is inserted between the lid 40, the inner side surface 33 of the container body 30, and the outer side surface 44a of the upper portion 44 of the lid 40 in a state of making contact with the upper surface 42b of the bottom portion 42 of the lid 40. In this insertion state, the bottom surface of the self-sealing gasket 70 is inclined outward as it advances downward and extends along the upper surface 42b of the bottom portion 42 of the lid 40. The self-sealing gasket 70 is formed from polytetrafluoroethylene or the like, for example.

Figure 3:
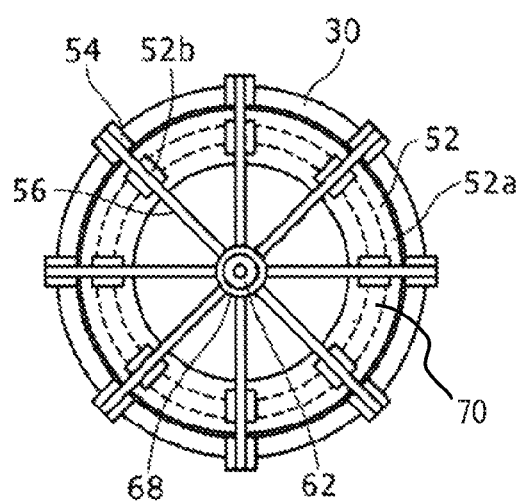
FIG. 3 is a cross-sectional view along line III-III in FIG. 1.
Figure 6:
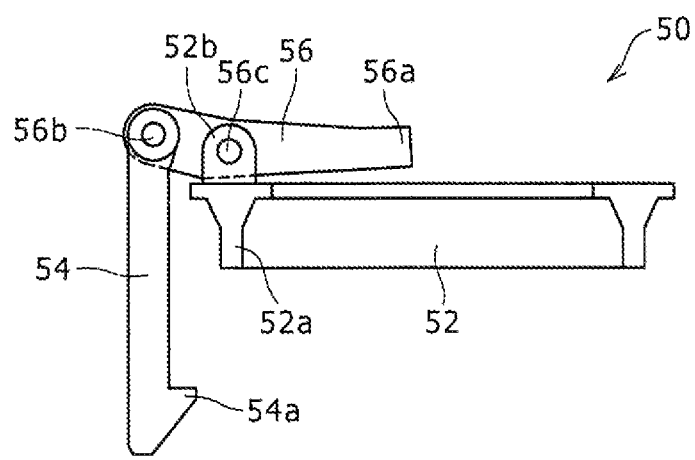
FIG. 6 is a cross-sectional view of a gasket presser of the salvage container illustrated in FIG. 1.

The gasket presser 50 clamps the self-sealing gasket 70 between the lid 40 and the gasket presser 50 and presses the self-sealing gasket 70 against the lid 40 to thereby compressively deform the self-sealing gasket 70. As illustrated in FIGS. 3 and 6 and other figures, the gasket presser 50 includes a pressing portion 52, a plurality of claw clamps (locked portions) 54, and a plurality of lever arms (connecting portions) 56.

The pressing portion 52 includes an approximately cylindrical pressing portion body 52a and a plurality of rotating support projections 52b that protrude upward from the upper surface of the pressing portion body 52a.

In a state where the lid 40 is mounted on the lid holder 33b and the self-sealing gasket 70 is inserted between the inner side surface 33 of the container body 30 and the outer side surface 44a of the upper portion 44 of the lid 40, the lower end portion of the pressing portion body 52a is inserted between the inner side surface 33 of the container body 30 and the outer side surface 44a of the upper portion 44 of the lid 40 from the upper side of the self-sealing gasket 70. In this insertion state, the lower end of the pressing portion body 52a makes contact with the self-sealing gasket 70. Moreover, in this insertion state, the upper end of the pressing portion body 52a protrudes upward more than the container body 30.

The rotating support projections 52b support the lever arms 56 so as to be rotatable in the vertical direction. These rotating support projections 52b are formed on the upper surface of the pressing portion body 52a at an equal interval in the circumferential direction.

The lever arms 56 are plate-shaped members. Intermediate portions 56c in the longitudinal direction of the lever arms 56 are connected to the rotating support projections 52b. The lever arms 56 rotate in the vertical direction about the connection portions 56c between the lever arms 56 and the rotating support projections 52b. In a state where the lid 40 is mounted on the lid holder 33b, the self-sealing gasket 70 is inserted between the inner side surface 33 of the container body 30 and the outer side surface 44a of the upper portion 44 of the lid 40, and the lower end portion of the pressing portion body 52a is inserted between the inner side surface 33 of the container body 30 and the outer side surface 44a of the upper portion 44 of the lid 40 (hereinafter this state is sometimes appropriately referred to as a pressing portion body insertion state), each lever arm 56 extends in an inside-outside direction (a radial direction of the pressing portion 52) from the position near the center of the pressing portion body 52a to a position located on the outer side than the container body 30 while passing through the rotating support projection 52b. The fixing member 46 of the lid 40 is inserted through a region surrounded by inner end portions 56a of the lever arms 56.

The claw clamps 54 have a plate shape. The claw clamps 54 are connected to the outer end portions 56b of the lever arms 56. The claw clamps 54 extends downward from the outer end portions 56b of the lever arms 56 approximately in parallel to the pressing portion body 52a. In the pressing portion body insertion state, the claw clamps 54 extend in the vertical direction approximately in parallel to the outer side surface 34 of the container body 30 on the outer side of the container body 30. The claw clamps 54 are connected to the lever arms 56 so that the claw clamps 54 can rotate in a direction of moving closer to or away from the outer side surface 34 of the container body 30 in the pressing portion body insertion state.

Figure 1:
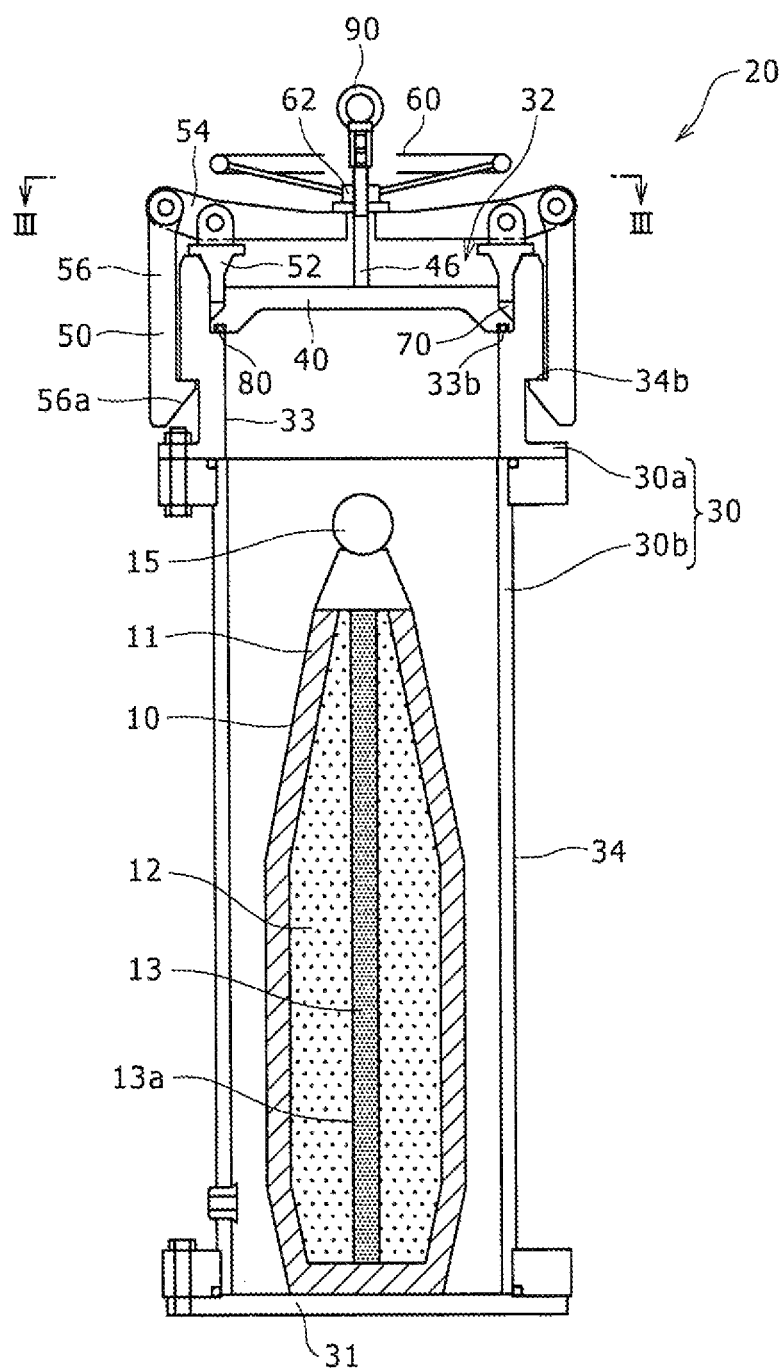
FIG. 1 is a vertical cross-sectional view of a state where chemical ammunition is accommodated in a salvage container according to a first embodiment of the present invention.
Figure 2:
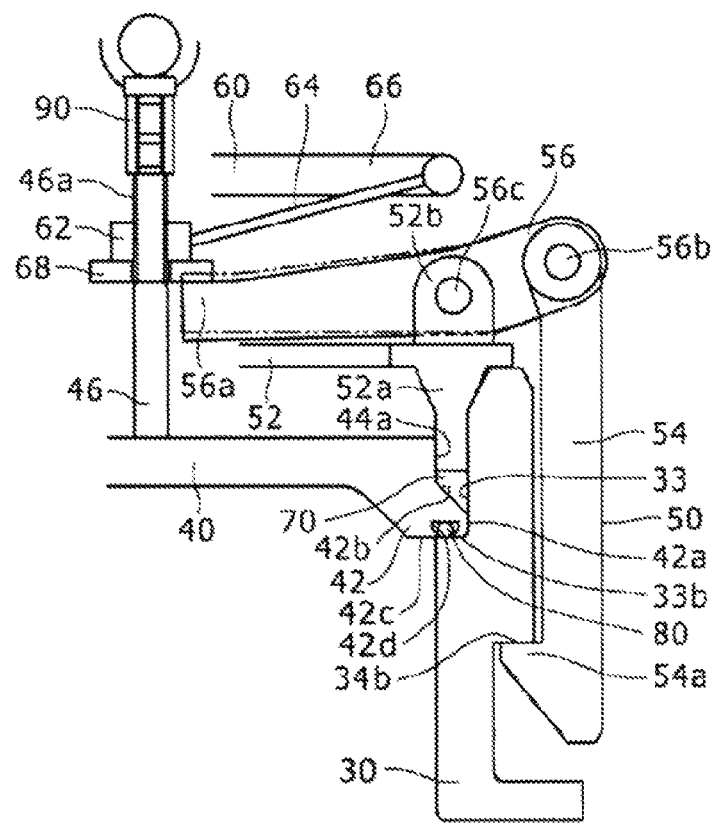
FIG. 2 is a partial enlarged view of FIG. 1.

A locking projection 54a that protrudes toward the pressing portion 52 (that is, the outer side surface 34 of the container body 30) in the pressing portion body insertion state is formed on the lower end of each claw clamp 54. As illustrated in FIG. 2 and other figures, the locking projections 54a are disposed under the claw clamping surface 34b of the container body 30 in the pressing portion body insertion state. As will be described later, the locking projections 54a make contact with the claw clamping surface 34b from the lower side when the inner end portions 56a of the lever arms 56 are pressed downward so that the lever arms 56 rotate in the vertical direction and the claw clamps 54 are moved upward. This contacting restricts the upward movement of the claw clamp 54 and the gasket presser 50. In this manner, the claw clamping surface 34b functions as a gasket presser holder that restricts the upward movement of the gasket presser 50 so that the gasket presser 50 is held on the container body 30.

In the first embodiment, eight rotating support projections 52b, lever arms 56, and claw clamps 54 are formed.

Figure 7:
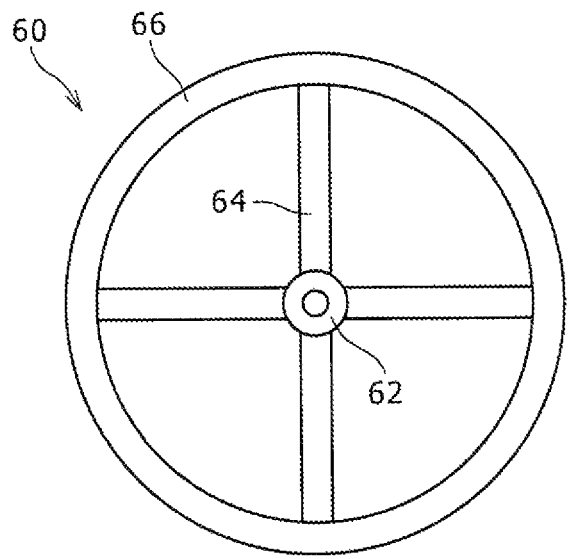
FIG. 7 is a plan view of a handle of the salvage container illustrated in FIG. 1.

The handle 60 presses the lever arms 56 downward. As illustrated in FIGS. 2 and 7 and other figures, the handle 60 includes a handle boss 62 that screws with the screw portion 46a of the fixing member 46 of the lid 40 and a grasping portion 66 connected to the handle boss 62.

The handle boss 62 screws with the screw portion 46a of the fixing member 46 at a position located on the upper side than the inner end portions 56a of the lever arms 56 in a state where the fixing member 46 is inserted in the region surrounded by the inner end portions 56a of the lever arms 56. A washer 68 is inserted between the handle boss 62 and the inner end portions 56a of the lever arms 56. The outer diameter of the washer 68 is set to be larger than the diameter of the region surrounded by the inner end portions 56a of the lever arms 56. Thus, the washer 68 makes contact with the inner end portions 56a of the lever arms 56 from the upper side. This contacting restricts the upward movement of the inner end portions 56a of the lever arms 56. The washer 68 moves downward when the handle boss 62 advances downward to thereby press the inner end portions 56a of the lever arms 56 downward.

The grasping portion 66 is a portion for rotating the handle boss 62. The grasping portion 66 has a ring shape having the same axis as the handle boss 62. The grasping portion 66 is connected to the handle boss 62 via a plurality of support members 64 that extend toward the outer side in the radial direction from the outer circumference of the handle boss 62. When an operator rotates the grasping portion 66, the handle boss 62 advances in relation to the screw portion of the fixing member 46. In the first embodiment, four support members 64 connect the grasping portion 66 and the handle boss 62. The outer diameter of the grasping portion 66 is larger than the outer diameter of the handle boss 62. Thus, the operator can easily operate the grasping portion 66. In the first embodiment, the outer diameter of the grasping portion 66 is approximately the same as the inner diameter of the container body 30.

The O-ring 80 hermetically seals the gap between the bottom surface 42c of the lid 40 and the lid holding surface 33b. The O-ring 80 is formed of a ring-shaped elastic member. The O-ring 80 is accommodated in the groove 42d that is formed in the bottom surface 42c of the lid 40. In this accommodation state, the O-ring 80 makes close contact with the inner side surface of the groove 42d and the lid holding surface 33b to thereby hermetically seal the gap between the bottom surface 42c and the lid holding surface 33b. The O-ring 80 is formed from nitrile butadiene rubber (NBR), for example.

Next, a method of salvaging the chemical ammunition 10 using the salvage container 20 having the above configuration will be described.

1) Preparing Step

In this step, the operator attaches the self-sealing gasket 70, the gasket presser 50, the handle 60, the suspended ring 90, and the O-ring 80 to the lid 40 on the land, a ship or the like.

Specifically, the self-sealing gasket 70 is mounted on the upper surface 42b of the bottom portion 42 of the lid 40 while inserting the fixing member 46 inside the self-sealing gasket 70. The lower ends of the pressing portions 52 are mounted on the self-sealing gasket 70 while inserting the fixing member 46 in the region surrounded by the inner end portions 56a of the lever arms 56. The washer 68 is inserted in the fixing member 46. The handle boss 62 screws with the screw portion 46a of the fixing member 46 to connect the handle 60 and the lid 40. In this case, the washer 68 restricts the upward movement of the inner end portions 56a of the lever arms 56 whereby the gasket presser 50 is also connected to the lid 40. Subsequently, the suspended ring 90 screws with and is connected to the upper end of the screw portion 46a of the fixing member 46. The O-ring 80 is inserted in the groove 42d of the lid 40.

2) Container Throwing Step

In this step, the operator throws the container body 30 and the lid 40 into the water.

In the first embodiment, a plurality of items of chemical ammunition 10 are salvaged. Thus, a plurality of container bodies 30 and a plurality of lids 40 are mounted on a frame 100, and a crane 110 mounted on a ship puts the frame 100 under the water (see the upper half of FIG. 15). The container bodies 30 can be self-supported. Thus, the container bodies 30 are mounted on the frame 10) in such an attitude that the container bodies are open upward and are self-supported.

3) Accommodating Step

In this step, the operator accommodates the chemical ammunition 10 in the salvage containers 20.

Figure 15:
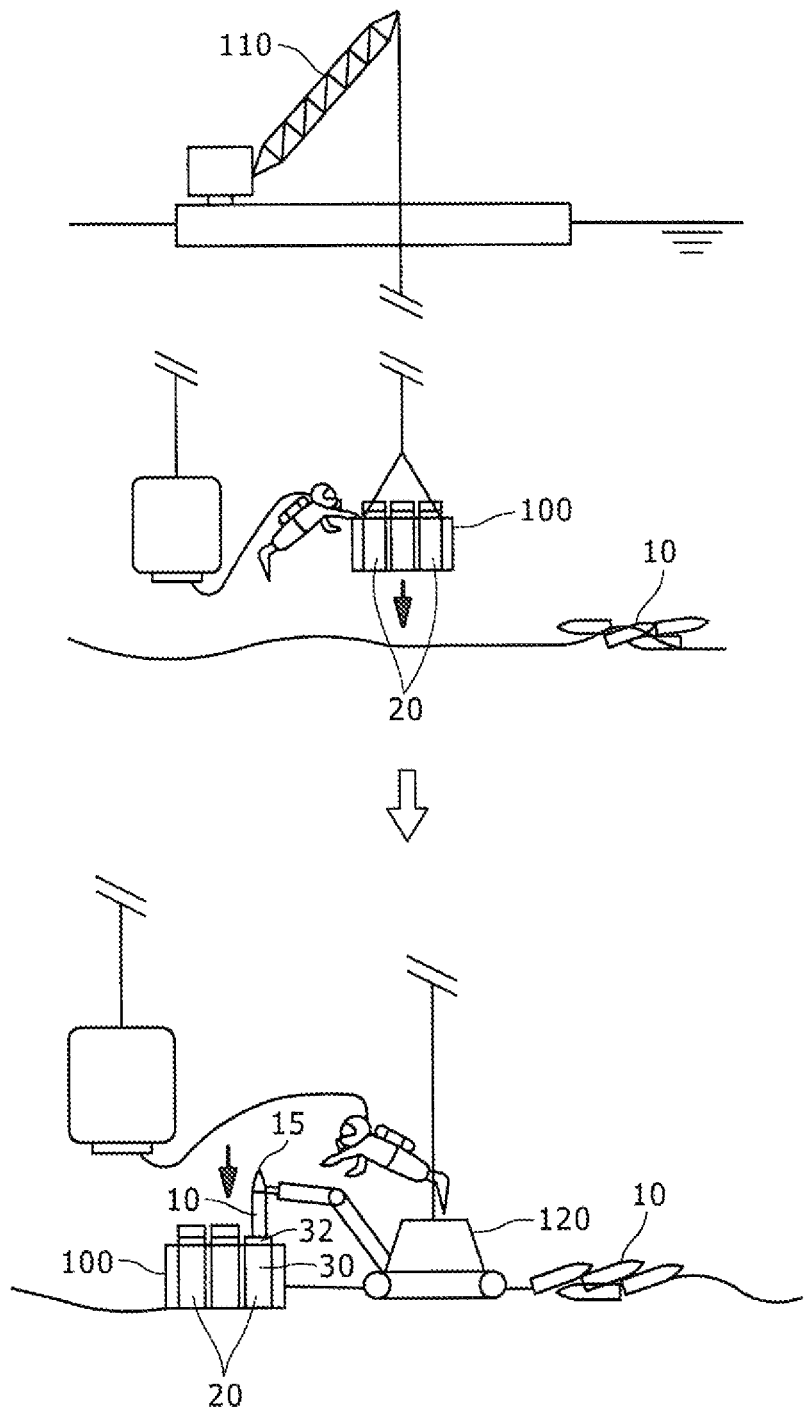
FIG. 15 is a diagram for describing a salvaging method according to the present invention.

Specifically, as illustrated in the lower half of FIG. 15, the operator inserts the chemical ammunition 10) in the container bodies 30 from the opening portions 32 of the container bodies 30 using a robot 120. In this case, the chemical ammunition 10 is inserted in the container body 30 in such an attitude that the fuse 15 is at the upper end.

Figure 8:
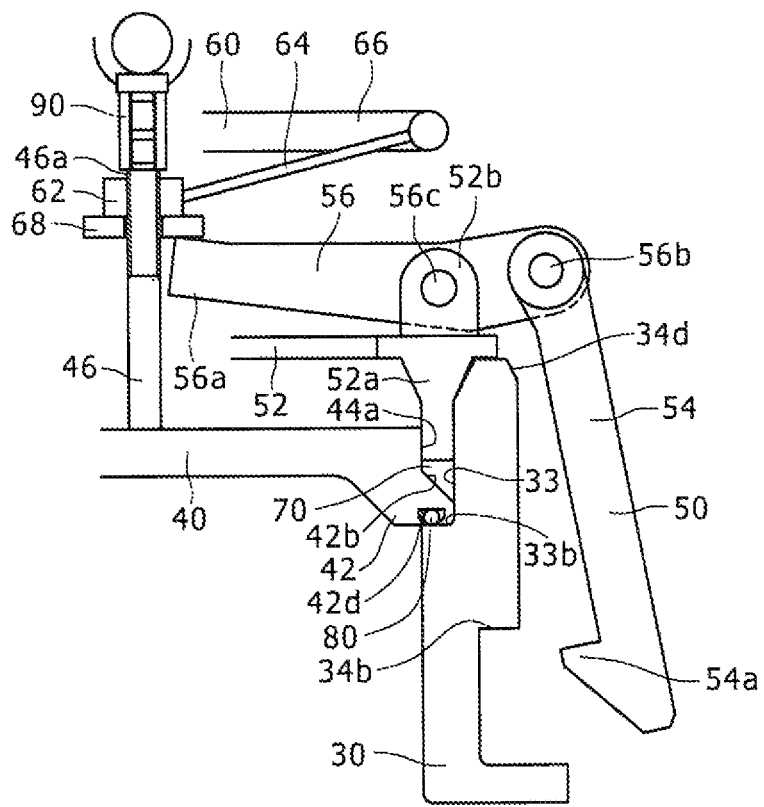
FIG. 8 is a diagram for describing the procedure of accommodating ammunition in the salvage container according to the first embodiment of the present invention.

Subsequently, as illustrated in FIG. 8, the claw clamps 54 are rotated outward about the outer end portions 56b of the lever arms 56 so that the container body 30 is inserted in the region surrounded by the claw clamps 54. The lid 40 to which the self-sealing gasket 70, the gasket presser 50, and the like are connected is inserted in the region surrounded by the inner side surface 33 of the container body 30 so that the lid 40 is mounted on the lid holding surface 33b. In this case, the lower end of the pressing portion body 52a is inserted between the outer side surface 44a of the upper portion 44 of the lid 40 and the inner side surface 33 of the container body 30. In the first embodiment, a tapered portion 34d that is inclined downward as it advances toward the outer side is formed on the outer end at the upper end of the container body 30. Thus, when the container body 30 is inserted in the region surrounded by the claw clamps 54, the claw clamps 54 are guided toward the outside by the tapered portion 34d and the claw clamps 54 are automatically rotated outward.

In the lid mounting state where the lid 40 is mounted on the lid holding surface 33b, the O-ring 80 is disposed between the inner side surface of the groove 42d of the lid 40 and the lid holding surface 33b. In the lid mounting state, the self-sealing gasket 70 is disposed on the upper surface 42b of the bottom portion 42 of the lid 40 and between the outer side surface 44a of the upper portion 44 of the lid 40 and the inner side surface 33 of the container body 30 in a state of being in contact with these surfaces. In the lid mounting state, the lower end portion of the pressing portion body 52a is disposed above the self-sealing gasket 70 and between the outer side surface 44a of the upper portion 44 of the lid 40 and the inner side surface 33 of the container body 30 in a state of being in contact with the self-sealing gasket 70.

Figure 9:
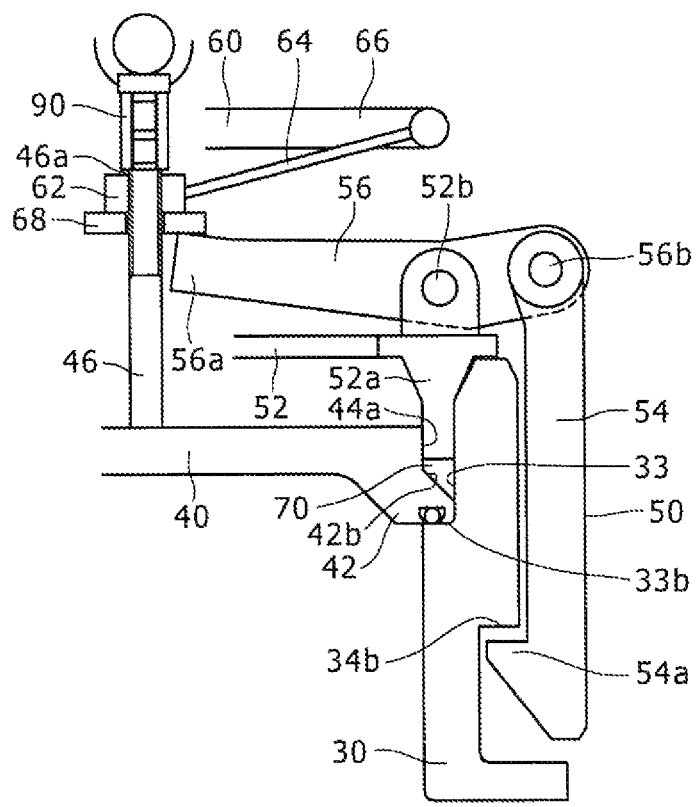
FIG. 9 is a diagram for describing the procedure of accommodating ammunition in the salvage container according to the first embodiment of the present invention.

Subsequently, as illustrated in FIG. 9, the claw clamps 54 are rotated inward so that the locked projections 54a of the claw clamps 54 are disposed under the claw clamping surface 34b and at such a position that the claw clamping surface 34b can make contact with the locked projections 54a from the upper side. In this case, the locked projections 54a are shifted downward by a predetermined amount from the claw clamping surface 34b. In the preparing step, at this time, the gasket presser 50 is connected to the lid 40 so that the locked projections 54a of the claw clamps 54 are shifted downward by a predetermined amount from the claw clamping surface 34b.

Subsequently, the handle 60 is rotated so that the handle boss 62 advances downward. When the handle boss 62 advances downward, the inner end portions 56a of the lever arms 56 are pressed downward by the handle boss 62 with the washer 68 interposed. When the inner end portions 56a of the lever arms 56 are pressed downward, the lever arms 56 are rotated in the vertical direction about the connection portion 56c between the rotating support projections 52b and the lever arms 56 and the outer end portions 56b of the lever arms 56 are moved upward. As a result, the claw clamps 54 are moved upward, and the locked projections 54a of the claw clamps 54 make contact with the claw clamping surface 34b from the lower side to the upper side. This contacting restricts the claw clamps 54 and the gasket presser 50 from moving upward in relation to the container body 30 so that the gasket presser 50 is held on the container body 30. In this manner, m the first embodiment, after the locked projections 54a are disposed at a position shifted downward from the claw clamping surface 34b, the locked projections 54a come into contact with the claw clamping surface 34b from the lower side according to the rotating operation of the handle 60. Thus, the contacting (that is, holding) of the gasket presser 50 on the container body 30 is facilitated.

After the locked projections 54a come into contact with the claw clamping surface 34b, the handle 60 is rotated further so that the handle boss 62 advances downward, and the inner end portions 56a of the lever arms 56 are pressed downward by the handle boss 62. In the state where the locked projections 54a are in contact with the claw clamping surface 34b, the outer end portions 56b which are the connection portions between the lever arms 56 and the claw clamps 54 cannot move upward. Thus, the inner end portions 56a of the lever arms 56 are pressed in a state where the locked projections 54a are in contact with the claw clamping surface 34b, whereby the lever arms 56 are rotated downward about the outer end portions 56b. Specifically, the lever arms 56 are rotated from the position indicated by a chain line in FIG. 2 to a position indicated by a solid line in FIG. 2. In this case, the rotating support projections 52b and the pressing portion body 52a connected to the lever arms 56 are moved downward. The pressing portion body 52a moved downward compresses the self-sealing gasket 70 between the pressing portion body 52a and the upper surface 42b of the bottom portion 42 of the lid 40 so that the self-sealing gasket 70 comes into close contact with the inner side surface 33 of the container body 30 and the outer side surface 44a of the upper portion 44 of the lid 40. In this manner, in the first embodiment, the self-sealing gasket 70 is compressively deformed in advance at a state before the salvage container 20 is lifted. As a result, the gap between the inner side surface 33 of the container body 30 and the lid 40 is hermetically sealed more reliably.

In this manner, the chemical ammunition 10 is accommodated in the salvage container 20 in a hermetically sealed state. The accommodating step is performed on the respective chemical ammunition 10. In the first embodiment, the operation of mounting the lid 40 on the lid holder 33b and the operation of rotating the handle 60 are performed with the hands of a diver (operator).

4) Lifting Step

In this step, the operator lifts the frame 100 on which the salvage container 20 in which the chemical ammunition 10 is accommodated is mounted. In the first embodiment, the operator lifts the frame 100 using the crane 110.

The frame 100 is lifted in a state where the self-supported attitude of the salvage container 20 is maintained with the opening portion thereof facing upward. The chemical ammunition 10 is accommodated in the salvage container 20 in such an attitude that the fuse 15 faces upward. Thus, the chemical ammunition 10 is lifted on the water in a state where the fuse 15 is prevented from colliding with the inner side surface 33 of the salvage container 20 so that the chemical ammunition 10 is exploded.

When the salvage container 20 is raised from the bottom of water, the pressure inside the salvage container 20 relatively increases to be larger than the pressure outside the salvage container 20 according to a decrease in the hydraulic pressure. This pressure difference adds upward force to the lid 40. The lid 40 is just mounted on the lid holding surface 33b and can be displaced upward. Thus, the lid 40 is displaced upward according to a decrease in the hydraulic pressure. With the upward displacement of the lid 40, upward force is added to the pressing portion 52 with the self-sealing gasket 70 interposed.

When the lid 40 is displaced upward so that the fixing member 46 of the lid 40 is displaced upward, the handle boss 62 that screws with the fixing member 46 is displaced upward.

The inner end portion 56a of the lever arm 56 of which the upward movement is restricted by the handle boss 62 can be displaced upward. However, due to the contacting between the locked projection 54a of the claw clamp 54 and the claw clamping surface 34b, the outer end portion 56b of the lever arm 56 cannot be displaced upward. Thus, even if upward force is applied to the pressing portion 52 according to the upward displacement of the lid 40, the lever arm 56 is just rotated about the outer end portion 56b. Thus, the amount of upward displacement of the pressing portion 52 in this case is the amount of displacement of the inner end portion 56a of the lever arm 56 (that is, the amount of upward displacement of the handle boss 62) and is smaller than the amount of upward displacement of the lid 40. That is, the inner end portion 56a of the lever arm 56 is displaced upward by the amount of displacement of the handle boss 62. In contrast, the pressing portion 52 is connected to a position closer to the outer end portion 56b of the lever arm 56, which is the rotation center, than the inner end portion 56a of the lever arm 56. Thus, the amount of upward displacement of the pressing portion 52 is smaller than the amount of displacement of the inner end portion 56a of the lever arm 56.

In this manner, when the amount of upward displacement of the lid 40 becomes larger than that of the pressing portion 52, the self-sealing gasket 70 disposed between the pressing portion 52 and the upper surface 42b of the bottom portion 42 of the lid 40 is further compressively deformed by being pressed by these portions. That is, the self-sealing gasket 70 is further closer contact with the inner side surface 33 of the container body 30 and the outer side surface 44a of the upper portion 44 of the lid 40 as compared to immediately before the step of lifting the salvage container 20. Thus, the salvage container 20 is lifted on the water in such a manner that the salvage container 20 is more hermetically sealed as it is lifted.

In this manner, in the salvaging method according to the first embodiment, the sealing state of the salvage container 20 is improved with a decrease in the hydraulic pressure. As a result, the leakage of the chemical agent 12 contained in the chemical ammunition 10 is more reliably suppressed. Moreover, bumping and volatilization of the chemical agent 12 with a decrease in the hydraulic pressure are suppressed.

In particular, it is possible to fix the gasket presser 50 to the container body 30 just by performing a simple operation of rotating the grasping portion 66 of the handle 60. As a result, operation efficiency is improved under poor sight conditions such as deep sea. Moreover, the self-scaling gasket 70 is compressively deformed to make close contact with the container body 30 and the lid 40 before lifting of the salvage container 20 starts. As a result, the leakage of the chemical agent 12 is more reliably suppressed.

Moreover, when the lid 40 and the like are attached to the container body 30, the claw clamp 54 is disposed at a position shifted from the claw clamping surface 34b of the container body 30. As a result, the claw clamp 54 can be easily disposed under the claw clamping surface 34b.

Moreover, the container body 30 can be self-supported, and insertion of the chemical ammunition 10 in the container body 30 and lifting of the container body 30 can be performed in a state where the container body 30 is self-supported. As a result, it is possible to more reliably prevent the occurrence of a situation where the chemical ammunition 10 collides with the inner side surface 33 of the container body 30 due to leaning of the container body 30 without being self-supported and the chemical ammunition 10 is exploded.

Here, the O-ring 80 may not be provided. However, when the O-ring 80 is provided between the bottom surface of the lid 40 and the lid holding surface 33b of the container body 30, the O-ring 80 suppresses the leakage of the chemical agent 12 from the gap between the container body 30 and the lid 40.

Figure 10:
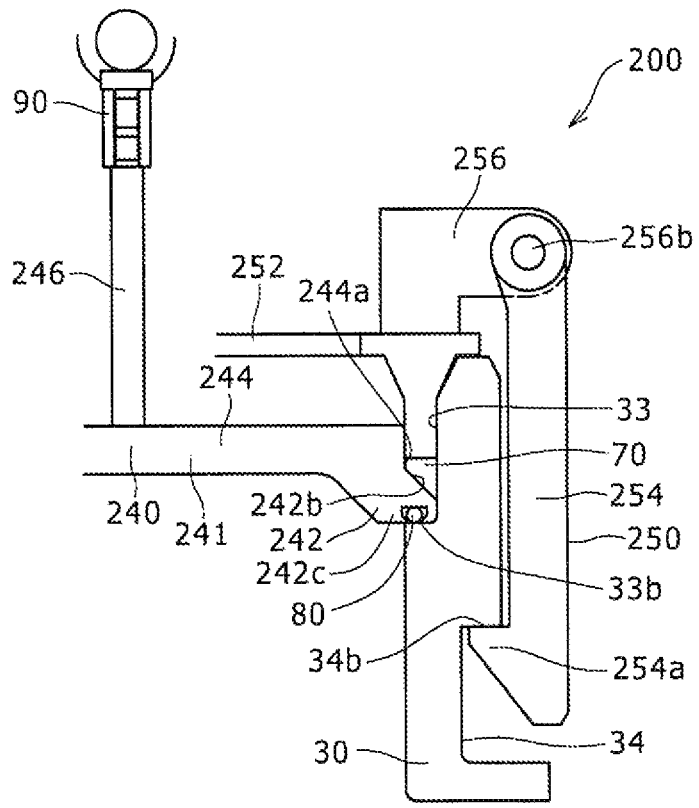
FIG. 10 is a cross-sectional view illustrating a portion of a salvage container according to a second embodiment of the present invention.
Figure 11:
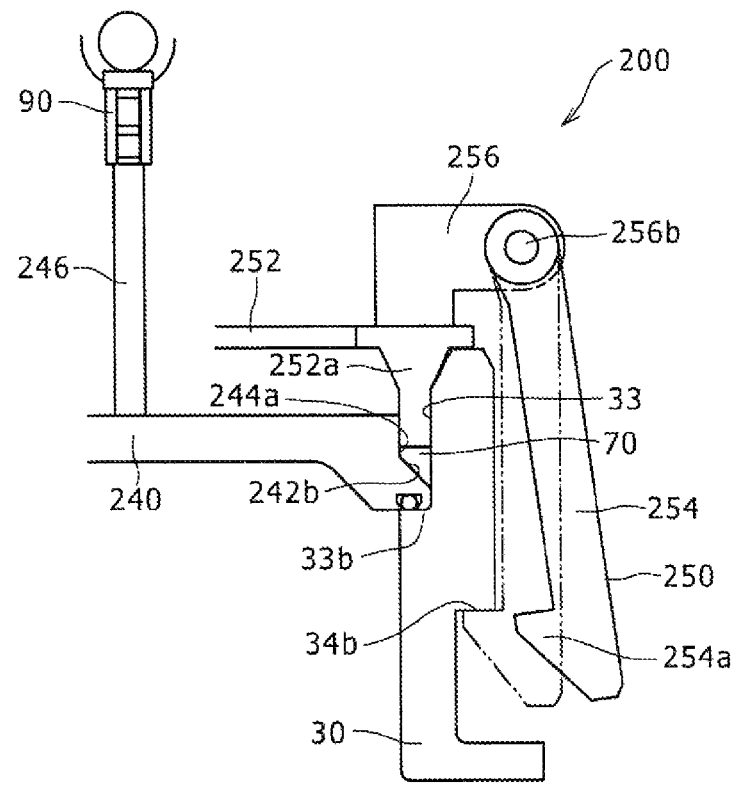
FIG. 11 is a diagram for describing the procedure of accommodating ammunition in the salvage container according to the second embodiment of the present invention.

Next, a salvage container 200 according to the second embodiment of the present invention will be described with reference to FIGS. 10 and 11. In the salvage container 200 according to the second embodiment, the handle 60 is omitted from the salvage container 20 according to the first embodiment. The structures of the lid and the gasket presser of the salvage container 200 according to the second embodiment are different from those of the salvage container 20 according to the first embodiment. Thus, only the structures of a lid 240 and a gasket presser 250 of the salvage container 200 according to the second embodiment will be described, and the other structures will not be described.

The lid 240 according to the second embodiment has a lid body 241 and a fixing member 246. The lid body 241 has the same structure as the lid body 41 according to the first embodiment and has a bottom portion 242 and an upper portion 244. The fixing member 246 does not have the screw portion that screws with the handle boss 62 unlike the fixing member 46 according to the first embodiment. Only the suspended ring 90 is fixed to the fixing member 246.

The gasket presser 250 according to the second embodiment has a pressing portion 252 and a claw clamp 254. The pressing portion 252 has the same structure as the pressing portion body 52a of the gasket presser 50 according to the first embodiment and has a pressing portion body 252a. The claw clamp 254 has approximately the same structure as the claw clamp 54 according to the first embodiment. On the other hand, the gasket presser 250 has a plurality of connecting members 256 instead of the plurality of lever arms 56 according to the first embodiment. These connecting members 256 connect the pressing portion 252 and the claw clamp 254.

The connecting members 256 extend outward from the upper surface of the pressing portion 252. The connecting members 256 extend outward more than the container body 30 in a state where the lower end portion of the pressing portion 252 is inserted between an outer side surface 244a of the upper portion 244 of the lid 240 and the inner side surface 33 of the container body 30. The claw clamp 254 is connected to the outer end portion 256b of the connecting member 256 in such a state that the claw clamp 254 can rotate in a direction of moving closer to or away from the outer side surface 34 of the container body 30. On the other hand, the pressing portion 252 and the connecting members 256 are connected so as not to be displaced relative to each other.

Each claw clamp 254 has a locked projection 254a. Each locked projection 254a protrudes toward the outer side surface 34 of the container body 30 in a state where the self-sealing gasket 70 is inserted between the outer side surface 244a of the upper portion 244 of the lid 240 and the inner side surface 33 of the container body 30 and the lower end portion of the pressing portion body 252a is disposed on the self-sealing gasket 70. Each locked projection 254a makes contact with the claw clamping surface 34b of the container body 30 from the lower side in a state where the self-sealing gasket 70 is inserted between the outer side surface 244a of the upper portion 244 of the lid 240 and the inner side surface 33 of the container body 30 and the lower end portion of the pressing portion body 252a is in contact with the self-sealing gasket 70.

In the salvage container 200 according to the second embodiment, in the preparing step, the fixing member 246 of the lid 240 is inserted inside the self-sealing gasket 70. The self-sealing gasket 70 is mounted on the upper surface 242b of the bottom portion 242 of the lid 240. The fixing member 246 is inserted inside the pressing portion 252 of the gasket presser 250. The suspended ring 90 screws with the upper end of the screw portion 46a of the fixing member 46. The O-ring 80 is inserted in a groove 242c of the lid 240.

In the container throwing step, the lid 240, the container body 30, and the like are thrown into the water.

In the accommodating step, the chemical ammunition 10 is inserted in the container body 30. After that, as illustrated in FIG. 11, the lid 240 is mounted on the lid holding surface 33b while the lower end portion of each pressing portion body 252a is inserted between the outer side surface 244a of the upper portion 244 of the lid 240 and the inner side surface 33 of the container body 30. After that, as indicated by a chain line in FIG. 11, the claw clamp 254 is rotated inward so that the locked projection 254a makes contact with the claw clamping surface 34b from the lower side. This contacting allows the lid 240, the gasket presser 250, and the like to be fixed to the container body 30.

In the second embodiment, the pressing portion 252 is connected to the connecting member 256 so as not to be rotatable. Thus, when the locked projection 254a and the claw clamping surface 34b make contact with each other, the upward displacement of the gasket presser 250 is disabled. Thus, when the hydraulic pressure decreases in the lifting step, the lid 240 only is displaced upward, whereby the self-sealing gasket 70 is compressively deformed and the salvage container 20 is hermetically sealed.

Figure 12:
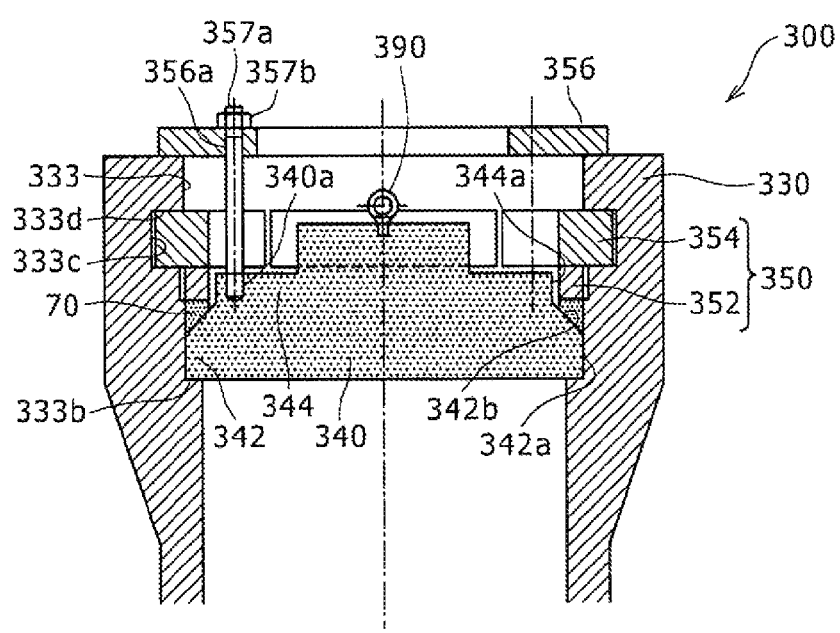
FIG. 12 is a cross-sectional view illustrating a portion of a salvage container according to a third embodiment of the present invention.
Figure 13:
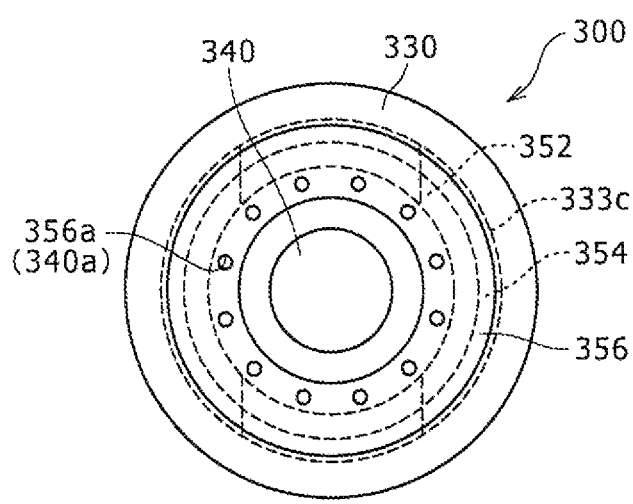
FIG. 13 is a plan view of FIG. 12.

Next, a salvage container 300 according to the third embodiment of the present invention will be described with reference to FIGS. 12 and 13. The salvage container 300 according to the third embodiment includes a cover 356 in addition to a container body 330, a lid 340, and a gasket presser 350. The container body 330, the lid 340, and the gasket presser 350 have the same functions as the container body 30, the lid 40, and the gasket presser 50 according to the first embodiment, respectively. The salvage container 300 according to the third embodiment has a self-sealing gasket 70 having the same function and structure as the self-sealing gasket 70 according to the first embodiment.

The lid 340 has a bottom portion 342 and an upper portion 344. The bottom portion 342 has an outer side surface 342a that faces the inner side surface 333 of the container body 30 over the entire circumference and an upper surface 342b that extends toward the inner side from the upper end of the outer side surface 342a. The upper portion 344 has an outer side surface 344a that extends upward from the inner end of the upper surface 342b of the bottom portion 342 and faces the inner side surface 333 over the entire circumference at a position that is shifted toward the inner side from the inner side surface 333 of the container body 330 more than the outer side surface 342a of the bottom portion 342. A suspended ring 390 having the same function as the suspended ring 90 according to the first embodiment is fixed to the upper surface of the lid 340. A plurality of bolt holes 340a are formed on the upper surface of the lid 340.

The container body 330 has an approximately bottomed cylindrical shape similarly to the first embodiment. A lid holding surface 333b that extends in a direction perpendicular to the vertical direction is formed on the inner side surface 333 of the container body 330. On the other hand, the claw clamping surface 34b is not formed on the outer side surface of the container body 330 unlike the first embodiment. A recess portion 333c for restricting the upward movement of the gasket presser 350 is formed on the inner side surface 333 of the container body 330 as a gasket presser holder. The recess portion 333c is recessed in the inner side surface 333 of the container body 330 toward the outer side in the radial direction over the entire circumference. The recess portion 333c is formed at a position above the lid holding surface 33b and at a position above the self-sealing gasket 70 in a state where the lid 340 is mounted on the lid holding surface 333b and the self-sealing gasket 70 is inserted between the lid 340 and the inner side surface 333 of the container body 330.

The inner diameter of a portion of the container body 330 located on the upper side than the lid holding surface 333b excluding the recess portion 333c is approximately constant and is approximately the same as the outer diameter of the lid 340 and the outer diameter of the self-sealing gasket 70.

The gasket presser 350 has a pressing portion 352 and a plurality of divided rings (restricting portions) 354. The pressing portion 352 and the divided rings 354 are separate parts. The divided rings 354 are disposed above the pressing portion 352.

The pressing portion 352 has a cylindrical shape. The pressing portion 352 is inserted between the outer side surface 344a of the upper portion 344 of the lid 340 and the inner side surface 333 of the container body 330 and is mounted on the self-sealing gasket 70 in a state where the lid 340 is mounted on the lid holding surface 333b and the self-sealing gasket 70 is inserted between the lid 340 and the inner side surface 333 of the container body 330.

Specifically, the inner diameter of the pressing portion 352 is larger than the outer diameter of the upper portion 344 of the lid 340, and the outer diameter of the pressing portion 352 is equal to or smaller than the inner diameter of the portion of the container body 330 located on the upper side than the lid holding surface 333b. The outer diameter of the pressing portion 352 is approximately the same as the inner diameter of the container body 330, for example. The length in the vertical direction of the pressing portion 352 is set to such a dimension that the upper end of the pressing portion 352 is located approximately at the same height as the lower end of the recess portion 333c or is above the lower end in a state where the pressing portion 352 is mounted on the self-sealing gasket 70. The length in the vertical direction of the pressing portion 352 is set to such a dimension that the upper end of the pressing portion 352 is located approximately at the same height as the lower end of the recess portion 333c, for example.

Figure 14:
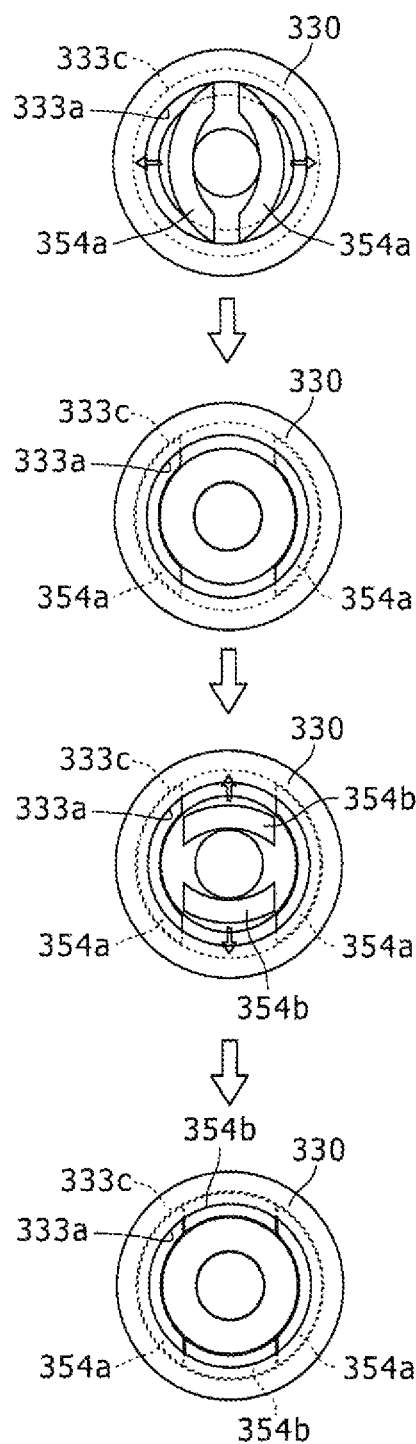
FIG. 14 is a diagram for describing the procedure of accommodating ammunition in the salvage container according to the third embodiment of the present invention.

The divided rings 354 restrict the upward movement of the pressing portion 352. These divided rings 354 each have such a shape that a cylinder is divided into a plurality of planes extending along the axis of the cylinder and form an approximately cylindrical shape as a whole. In the third embodiment, the divided rings 354 have such a shape that a cylinder is divided into four parts. As illustrated at the bottom of FIG. 14, the divided rings 354 include a pair of divided rings 354a having a long arc and a pair of divided rings 354b having a short arc.

The divided rings 354 are inserted in the recess portion 333c. In this insertion state, the divided rings 354 make contact with the pressing portion 352 from the upper side over the entire circumference as a whole and make contact with a top wall 333d of the recess portion 333c.

Specifically, the thickness in the vertical direction of each divided ring 354 is set to be equal to or smaller than the length in the vertical direction of the recess portion 333c. The outer diameter of each divided ring 354 is set to be larger than the inner diameter of the container body 330. The inner diameter of each divided ring 354 is set to be equal to or smaller than the inner diameter of the pressing portion 352. In the third embodiment, the thickness of each divided ring 354 is set to be approximately the same as the length in the vertical direction of the recess portion 333c. The outer diameter of each divided ring 354 is set to be approximately the same as the diameter of the outer end of the recess portion 333c. The inner diameter of each divided ring 354 is set to be approximately the same as the inner diameter of the pressing portion 352. The divided rings 354 restrict the upward movement of the pressing portion 352 by making contact with the pressing portion 352 from the upper side in a state where upward movement of the divided rings 354 is restricted due to the contacting with the top wall 333d of the recess portion 333c.

Here, as described above, the outer diameter of each divided ring 354 is larger than the inner diameter of the container body 330. Thus, in order to insert these divided rings 354 in the recess portion 333c, at least a portion of each of these divided rings 354 needs to be inserted inside the container body 330 in a state of being inclined in the vertical direction. Here, at least a portion of these divided rings 354 has such a shape that it is inserted in the recess portion 333c in a state of being inclined in the vertical direction in this manner. In the third embodiment, the divided rings 354a having the long arc are inclined in the vertical direction whereby the divided rings can be inserted in the recess portion 333c. On the other hand, the divided rings 354b having the short arc have a width that is set to be smaller than the inner diameter of the container body 330 and can be inserted in the recess portion 333c without being inclined.

The cover 356 lifts the lid 340 upward in relation to the gasket presser 350 to thereby compressively deform the self-sealing gasket 70. The cover 356 has a cylindrical shape. The outer diameter of the cover 356 is larger than the inner diameter of the upper end of the container body 330 and the cover 356 is mounted on the upper surface of the container body 330. A plurality of through-holes 356a are formed in the cover 356. These through-holes 356a are formed at the positions corresponding to the bolt holes 340a formed in the lid 340. The distal ends of bolts 357a inserted into the through-holes 356a screw with the bolt holes 340a. Nuts 357b screw with the bolts 357a on the upper side than the cover 356. When the nut 357b advances toward the lid 340, the lid 340 is lifted toward the cover 356 (toward the upper side).

In the third embodiment, the preparing step is omitted. In the container throwing step, the lid 340, the self-sealing gasket 70, the gasket presser 350, and the cover 356 are thrown into the water in a mutually separated state. These lid 340, self-sealing gasket 70, gasket presser 350, and cover 356 may be connected in advance and may be separated under the water.

In the accommodating step, the chemical ammunition 10 is accommodated in the salvage containers 300.

Specifically, the chemical ammunition 10 is inserted in the container body 330. The lid 340 is mounted on the lid holding surface 333b. The self-sealing gasket 70 is inserted between the outer side surface 344a of the upper portion 344 of the lid 340 and the inner side surface 333 of the container body 330. The pressing portion 352 is inserted between the outer side surface 344a of the upper portion 344 of the lid 340 and the inner side surface 333 of the container body 330 and is mounted on the gasket 70.

Subsequently, the divided rings 354 are inserted in the recess portion 333c. Specifically, first, as illustrated in FIG. 14, the pair of divided rings 354a having the long arc are inserted in the recess portion 333c by being inclined in the vertical direction. After that, the pair of divided rings 354b having the short arc are inserted between the divided rings 354a in the recess portion 333c. In this case, the divided rings 354 make contact with the pressing portion 352 from the upper side. Moreover, the divided rings 354 make contact with the top wall 333d of the recess portion 333c.

After that, the cover 356 is mounted on the upper surface of the container body 330. The bolt 357a is inserted into the through-hole 356a of the cover 356 and screws with the bolt hole 340a of the lid 340. The nut 357b screws with the bolt 357a on the upper side than the cover 356. The nut 357b advances toward the lid 340, and the lid 340 is lifted toward the cover 356. As a result, the self-sealing gasket 70 is compressively deformed between the lid 340 and the pressing portion body 352. In this manner, the bolt 357a and the nut 357b function as a lid lifting member capable of lifting the lid 340 upward while compressively deforming the self-sealing gasket 70 between the lid 340 and the pressing portion body 352 and the pressing portion 350.

In the lifting step, the salvage container 300 in which the chemical ammunition 10 is accommodated or the frame 100 on which the salvage container 300 is mounted is lifted.

When the salvage container 300 is lifted, the pressure inside the salvage container 330 increases relatively to the outside pressure according to a decrease in the hydraulic pressure, and the lid 340 is displaced upward. In this case, the pressing portion 352 of the gasket presser 350 is in contact with the divided rings 354 from the upper side, and the divided rings 354 are in contact with the top wall 333d of the recess portion 333c from the upper side. Thus, the gasket presser 350 cannot move upward. Therefore, the self-sealing gasket 70 is further compressively deformed between the gasket presser 350 and the lid 340 according to upward displacement of the lid 340.

In this manner, in the third embodiment, since the self-sealing gasket 70 is compressively deformed according to a decrease in the hydraulic pressure, the salvage container 300 can be lifted in a hermetically sealed state.

Here, in the respective embodiments, although a case where the self-sealing gasket 70 has a ring shape has been described, the self-sealing gasket is not limited to the ring shape as long as it has such a shape that the gap between the lid and the container body can be hermetically sealed. For example, the self-sealing gasket may have such a disk shape that it extends over the entire region surrounded by the inner side surface of the container body. However, the ring-shaped self-sealing gasket can further increase the pressure (that is, sealing pressure) associated with the self-sealing gasket and increase the amount of compressive deformation of the self-sealing gasket as compared to the disk-shaped self-sealing gasket. As a result, the sealing state of the salvage container is improved.

Moreover, in the respective embodiments, although a case of salvaging the chemical ammunition 10 has been described, the salvaging object is not limited to the chemical ammunition 10. Although the salvage container and the salvaging method according to the present invention aim to suppress the leakage of a chemical agent contained in the chemical ammunition 10 to the outside, it is difficult to distinguish the chemical ammunition 10 from normal ammunition under the water since the chemical ammunition 10 and the normal ammunition that does not contain a chemical agent have a small difference in their appearance. Thus, it is preferable to salvage all ammunitions using the present salvaging method.

As described above, the present invention provides a salvage container for salvaging ammunition, which has been dumped into the water, on the water, including: a container body that has a bottomed cylindrical shape that is open in a specific direction so that the ammunition is inserted therein and that has an inner side surface surrounding the ammunition inserted therein; a lid that is disposed in a region surrounded by the inner side surface of the container body so as to block an opening portion of the container body; a gasket that is disposed in the region surrounded by the inner side surface of the container body so as to block a gap between the inner side surface of the container body and the lid from the outside in the specific direction of the lid; and a gasket presser that is disposed at the outside in the specific direction of the gasket so as to clamp the gasket between the lid and the gasket presser, wherein: the container body includes a lid holder that holds the lid and a gasket presser holder that holds the gasket presser, the lid holder holds the lid so that the lid is not displaced toward the inside in the specific direction in relation to the container body and is displaced toward the outside in the specific direction, the gasket presser holder holds the gasket presser so that, when the lid is displaced toward the outside in the specific direction in relation to the container body according to a decrease in hydraulic pressure, the amount of relative displacement at the outside in the specific direction of the gasket presser in relation to the container body is smaller than the amount of relative displacement at the outside in the specific direction of the lid in relation to the container body whereby the lid is displaced toward the outside in the specific direction in relation to the gasket presser, and the gasket is configured to be compressively deformed between the lid and the gasket presser when the lid is displaced toward the outside in the specific direction in relation to the gasket presser, and hermetically seals the gap between the inner side surface of the container body and the lid by making close contact with the inner side surface of the container body and the lid according to the compressive deformation.

According to the present invention, the gap between the inner side surface of the container body and the lid is hermetically sealed by the compressive deformation of the gasket. As a result, ammunition is salvaged in the hermetically sealed state, and when the ammunition contains a chemical agent, the leakage of the chemical agent into the water or the atmosphere can be suppressed in a more reliable manner. In particular, the lid is displaced toward the outer side in the specific direction in relation to the gasket presser according to a decrease in the hydraulic pressure, whereby the gasket is compressively deformed. Thus, it is possible to suppress the amount of compressive deformation of the gasket to be small at the point in time when the ammunition is accommodated in the salvage container. As a result, it is possible to eliminate an operation of compressively deforming the gasket in the water or to suppress the workload thereof to be small.

In this device, it is preferable that the lid has a bottom portion and a front portion formed at the outside in the specific direction of the bottom portion, the bottom portion has an outer side surface that extends in the specific direction so as to face the inner side surface of the container body over an entire circumference of the inner side surface and an outer surface that extends from an outer end portion in the specific direction of the outer side surface to an inside of the container body, the front portion has an outer side surface that extends from the outer surface of the bottom portion to the outside in the specific direction so as to face the inner side surface of the container body over an entire circumference of the inner side surface at a position shifted from the inner side surface of the container body to the inside of the container body more than the outer side surface of the bottom portion, the gasket has such a shape that the gasket is inserted between the inner side surface of the container body and the outer side surface of the front portion over the entire circumference of these surfaces, the gasket presser has a pressing portion that extends in the specific direction, at least an end portion at the inside in the specific direction being inserted between the inner side surface of the container body and the outer side surface of the front portion over the entire circumference of the inner side surface from the outside in the specific direction, and the pressing portion is configured to compressively deform the gasket between the outer surface of the bottom portion and the pressing portion so that the gasket makes close contact with the outer side surface of the front portion and the inner side surface of the container body.

By doing so, the force (that is, sealing pressure) applied to the gasket when the hydraulic pressure decreases increases as compared to a case where the gasket is provided on the entire surface of the lid. As a result, the sealing of the gap between the inner side surface of the container body and the lid by the gasket becomes more reliable.

In the above device, it is preferable that the container body have an outer side surface on which the gasket presser holder is formed, the gasket presser include a plurality of locked portions that are connected to the pressing portion and extend approximately in parallel to the pressing portion inserted between the inner side surface of the container body and the outer side surface of the front portion of the lid at the outside of the container body, each of the locked portions include a locked projection that protrudes toward the outer side surface of the container body, the gasket presser holder be formed at a position located at the outside in the specific direction more than the locked projections and protrude from the outer side surface of the container body toward the outside of the container body up to such a position that the gasket presser holder makes contact with the locked projections from the outside in the specific direction, and the locked portions have the locked projections that are disposed at the inner side in the specific direction of the gasket presser holder and are configured to rotate between a contacting position where the gasket presser holder makes contact with the locked projections from the outside in the specific direction and a position shifted toward the outside of the container body more than the contacting position.

By doing so, it is possible to dispose the locked projections at the contacting position to allow the gasket presser holder to make contact with the locked projections by a simple operation of rotating the locked portions of the gasket presser. As a result, attachment of the gasket presser to the gasket presser holder and the container body is made easy.

In the above configuration, it is preferable that the gasket presser include a plurality of connecting portions that extend in an inside-outside direction of the container body and are connected to the pressing portion so as to be rotatable in the specific direction, the locked portions be connected to end portions of the connecting portions at the outside of the container body, the salvage container further include a pressing member that makes contact with end portions of the connecting portions at the inside of the container body from the outside in the specific direction so as to restrict the end portions of the connecting portions at the inside of the container body from being displaced toward the outside in the specific direction in relation to the lid and press the end portions of the connecting portions at the inside of the container body toward the inside in the specific direction, the pressing member press the end portions of the connecting portions at the inside of the container body in a state where the locked projections are at positions shifted from the gasket presser holder toward the inside in the specific direction to thereby rotate the connecting portions about a connection portion between each connecting portion and the pressing portion up to a position where the locked projections make contact with the gasket presser holder from the inside in the specific direction, and the pressing member further press the end portions of the connecting portions at the inside of the container body toward the inside in the specific direction in a state where the locked projections are in contact with the gasket presser holder to thereby rotate the connecting portions about a connection portion between each connecting portion and each locked portion up to a position where the pressing portion compressively deforms the gasket between the outer surface of the bottom portion of the lid and the pressing portion.

According to this configuration, it is possible to allow the locked projections to make contact with the gasket presser holder from the inner side in the specific direction to compressively deform the gasket by a simple operation of disposing the locked portions on the inner side in the specific direction of the gasket presser holder and pressing the end portion of the connecting portion on the inner side of the container body with the pressing member. As a result, the operation efficiency is improved. Moreover, according to this configuration, the gasket is compressively deformed at a stage before the salvage container is lifted. As a result, the sealing of the gap between the inner side surface of the container body and the lid becomes more reliable.

In the above configuration, it is preferable that the lid include a fixing member in which a screw portion protruding toward the outside in the specific direction from approximately the center of the front portion so as to extend in the specific direction is formed in at least a portion thereof, and the pressing member include a screwing portion that screws with the screw portion of the fixing member and advances in an axial direction of the screw portion.

According to this configuration, it is possible to operate the gasket presser including the pressing member and the connecting portion with a simple operation of rotating the screwing portion so that the screwing portion advances. As a result, the operation efficiency is improved.

In addition, it is preferable that the pressing member include a grasping portion that has an outer shape larger than the screwing portion and that an operator grasps in order to rotate the screwing portion.

According to this configuration, it is possible to operate the gasket presser including the pressing member and the connecting portion by grasping and rotating the grasping portion. As a result, the operation of the gasket presser is made easy even in the water where workability is relatively poor.

In the present invention, it is preferable that the gasket presser include a restricting portion that is formed separately from the pressing portion and that is disposed at the outside in the specific direction of the pressing portion so as to restrict movement of the pressing portion toward the outside in the specific direction by making contact with the pressing portion from the outside in the specific direction, and the gasket presser holder be formed at a position closer to the outside in the specific direction than the restricting portion and protrude from the inner side surface of the container body toward the inside of the container body up to such a position that the gasket presser holder makes contact with the restricting portion from the outside in the specific direction.

According to this configuration, the displacement of the gasket toward the outer side in the specific direction is disabled by a simple operation of disposing the restricting portion of the gasket presser on the inner side in the specific direction than the gasket presser holder, whereby the gasket is compressed by the lid when the lid is displaced toward the outer side in the specific direction according to a decrease in the hydraulic pressure. As a result, the gap between the inner side surface of the container body and the lid is hermetically sealed by the gasket.

As a specific configuration of the restricting portion of the gasket presser, the restricting portion may be divided into a plurality of divided members that have such a shape that the divided members make contact with approximately the entire circumference of the pressing portion and form the shape by assembling, and each of the divided members may be configured to pass through a region surrounded by the end portions of the gasket presser holder at the inside of the container body from the outside in the specific direction of the gasket presser holder to a position at the inside in the specific direction of the gasket presser holder.

In the above configuration, it is preferable that the salvage container further include a lid lifting member that is configured to compressively deform the gasket between the lid and the pressing portion and lift the lid toward the outside in the specific direction in relation to the container body.

According to this configuration, it is possible to compressively deform the gasket with a simple operation of lifting the lid using the lid lifting member at a stage before the salvage container is lifted. As a result, the sealing of the gap between the inner side surface of the container body and the lid becomes more reliable.

In addition, it is preferable that the container body be configured to be self-supported in such an attitude that the container body is open toward the outside in the specific direction.

According to this configuration, the ammunition can be inserted in the container body from the outer side in the specific direction in a state where the container body is self-supported. As a result, the insertion of the ammunition in the container body is made easy. Moreover, according to this configuration, the attitude of the salvage container can be maintained during insertion of the ammunition and lifting of the salvage container by lifting the salvage container including the container body while maintaining the self-supported state. As a result, it is possible to prevent the occurrence of a situation where as the attitude of the ammunition changes, the ammunition collides with the inner side surface of the container body and the ammunition is exploded.

The present invention also provides a method of salvaging ammunition on the water using the salvage container described above, including: a container throwing step of throwing the salvage container into the water; an accommodating step of accommodating the ammunition in the salvage container; and a lifting step of lifting the salvage container in which the ammunition is accommodated on the water, wherein: the accommodating step includes: a step of inserting the ammunition into the container body; a step of allowing the lid holder to hold the lid at such a position that the opening portion of the container body is blocked; a step of disposing the gasket at such a position that the gap between the inner side surface of the container body and the lid is blocked from the outside in the specific direction of the lid; and a step of allowing the gasket presser holder to hold the gasket presser at a position located at the outside in the specific direction of the gasket, and the lifting step involves lifting the container body while compressively deforming the gasket between the gasket presser and the lid according to relative displacement of the lid toward the outside in the specific direction in relation to the container body according to a decrease in the hydraulic pressure to allow the gasket to make close contact with the container body and the lid.

According to this method, with a decrease in the hydraulic pressure when the salvage container is salvaged, the gasket is compressively deformed so that the gap between the inner side surface of the container body and the lid is hermetically sealed. As a result, the ammunition can be salvaged in a hermetically sealed state. Moreover, an operation of compressively deforming the gasket under the water or the like where the workability is relatively poor can be eliminated, or the workload thereof can be suppressed, and the workability can be improved.

The invention claimed is:

1. A salvage container for salvaging ammunition, which has been dumped into water, comprising:
   a container body that has a cylindrical shape that is open in an axial direction so that the ammunition is inserted therein and that has an inner side surface surrounding the ammunition inserted therein;
   a lid that is disposed in a region surrounded by the inner side surface of the container body so as to block an opening portion of the container body;
   a gasket that is disposed in the region surrounded by the inner side surface of the container body so as to block a gap between the inner side surface of the container body and the lid from an outer side of the lid in the axial direction; and
   a gasket presser that is disposed at the outer side of the lid in the axial direction so as to clamp the gasket between the lid and the gasket presser, wherein:
   the container body includes a lid holder that holds the lid and a gasket presser holder that holds the gasket presser,
   the lid holder holds the lid so that the lid is not displaced toward a closed end of the container body in the axial direction in relation to the container body and is displaced toward an open end of the container body in the axial direction,
   the gasket presser holder holds the gasket presser so that, when the lid is displaced toward the open end of the container body in the axial direction in relation to the container body according to a decrease in hydraulic pressure, the amount of relative displacement at the open end of the container body in the axial direction in relation to the container body is smaller than the amount of relative displacement at the open end of the container body in the axial direction in relation to the container body whereby the lid is displaced toward the open end of the container body in the axial direction in relation to the gasket presser, and
   the gasket is configured to be compressively deformed between the lid and the gasket presser when the lid is displaced toward the open end of the container body in the axial direction in relation to the gasket presser, and hermetically seals the gap between the inner side surface of the container body and the lid by making close contact with the inner side surface of the container body and the lid according to the compressive deformation.

2. The salvage container according to claim 1, wherein
   the lid has a bottom portion and a top portion formed at the open end of the container body in the axial direction,
   the bottom portion has an outer side surface that extends in the axial direction so as to face the inner side surface of the container body over an entire circumference of the inner side surface and an inclined surface that extends inwardly from the outer side surface of the bottom portion,
   the top portion has an outer side surface that extends from the inclined surface of the bottom portion to the open end of the container body in the axial direction so as to face the inner side surface of the container body over an entire circumference of the inner side surface at a position shifted from the inner side surface of the container body to an inside of the container body more than the outer side surface of the bottom portion,
   the gasket has such a shape that the gasket is inserted between the inner side surface of the container body and the outer side surface of the top portion over the entire circumference of the inner side surface and the outer side surface, the gasket presser has a pressing portion that extends in the axial direction, at least an end portion at the closed end of the container body in the axial direction being inserted between the inner side surface of the container body and the outer side surface of the top portion over the entire circumference of the inner side surface from the open end of the container body in the axial direction, and the pressing portion is configured to compressively deform the gasket between the inclined surface of the bottom portion and the pressing portion so that the gasket makes close contact with the outer side surface of the top portion and the inner side surface of the container body.

3. The salvage container according to claim 2, wherein the container body has an outer side surface on which the gasket presser holder is formed, the gasket presser includes a plurality of locked portions that are connected to the pressing portion and extend approximately in parallel to the pressing portion, each of the locked portions includes a locked projection that protrudes toward the outer side surface of the container body, the gasket presser holder protrudes from the outer side surface of the container body and the gasket presser holder makes contact with the locked projections, and the locked portions are configured to rotate between a contacting position where the gasket presser holder makes contact with the locked projections and a non-contacting position where the gasket presser holder does not make contact with the locked projections.

4. The salvage container according to claim 3, wherein the gasket presser includes a plurality of connecting portions that extend in a radial direction of the container body and are connected to the pressing portion so as to be rotatable in the axial direction, the locked portions are connected to end portions of the connecting portions, the salvage container further includes a pressing member that makes contact with the end portions of the connecting portions at the inside of the container body from the open end of the container body in the axial direction so as to restrict the end portions of the connecting portions at the inside of the container body from being displaced toward the open end of the container body in the axial direction in relation to the lid and press the end portions of the connecting portions at the inside of the container body toward the closed end of the container body in the axial direction, and the pressing member presses the end portions of the connecting portions at the inside of the container body in a state where the locked projections are at positions shifted from the gasket presser holder toward the closed end of the container body in the axial direction to thereby rotate the connecting portions about a connection portion between each connecting portion and the pressing portion up to a position where the locked projections make contact with the gasket presser holder from the closed end of the container body in the axial direction, and the pressing member further presses the end portions of the connecting portions at the inside of the container body toward the closed end of the container body in the axial direction in a state where the locked projections are in contact with the gasket presser holder to thereby rotate the connecting portions about a connection portion between each connecting portion and each locked portion up to a position where the pressing portion compressively deforms the gasket between the inclined surface of the bottom portion of the lid and the pressing portion.

5. The salvage container according to claim 4, wherein the lid includes a fixing member in which a screw portion protruding toward the open end of the container body in the axial direction from approximately the center of the top portion so as to extend in the axial direction is formed in at least a portion thereof, and the pressing member includes a screwing portion that screws with the screw portion of the fixing member and advances in an axial direction of the screw portion.

6. The salvage container according to claim 5, wherein the pressing member includes a grasping portion that has an outer shape larger than the screwing portion and that an operator grasps in order to rotate the screwing portion.

7. The salvage container according to claim 2, wherein the gasket presser includes a restricting portion that is formed separately from the pressing portion and that is disposed at the open end of the container body in the axial direction so as to restrict movement of the pressing portion toward the open end of the container body in the axial direction by making contact with the pressing portion from the open end of the container body in the axial direction, and the gasket presser holder is formed at a position closer to the open end of the container body in the axial direction than the restricting portion and protrudes from the inner side surface of the container body toward the inside of the container body up to such a position that the gasket presser holder makes contact with the restricting portion.

8. The salvage container according to claim 7, wherein the restricting portion is divided into a plurality of divided members that have such a shape that the divided members make contact with approximately the entire circumference of the pressing portion and form the shape by assembling, and each of the divided members is configured to pass through a region surrounded by the end portions of the gasket presser holder at the inside of the container body from the open end of the container body in the axial direction to a position at the closed end of the container body in the axial direction.

9. The salvage container according to claim 7, wherein the salvage container further includes a lid lifting member that is configured to compressively deform the gasket between the lid and the pressing portion and lift the lid toward the open end of the container body in the axial direction in relation to the container body.

10. The salvage container according to claim 8, wherein the salvage container further includes a lid lifting member that is configured to compressively deform the gasket between the lid and the pressing portion and lift the lid toward the open end of the container body in the axial direction in relation to the container body.

11. The salvage container according to claim 1, wherein the container body is configured to be self-supported in such an attitude that the container body is open in the axial direction.

12. A method of salvaging ammunition on the water using the salvage container according to claim 1, comprising:
a container throwing step of throwing the salvage container into the water;

an accommodating step of accommodating the ammunition in the salvage container; and a lifting step of lifting the salvage container in which the ammunition is accommodated on the water, wherein:

the accommodating step includes:

a step of inserting the ammunition into the container body;

a step of allowing the lid holder to hold the lid at such a position that the opening portion of the container body is blocked;

a step of disposing the gasket at such a position that the gap between the inner side surface of the container body and the lid is blocked from the open end of the container body in the axial direction; and a step of allowing the gasket presser holder to hold the gasket presser at a position located at the open end of the container body in the axial direction, and the lifting step involves lifting the container body while compressively deforming the gasket between the gasket presser and the lid according to relative displacement of the lid toward the open end of the container body in the axial direction in relation to the container body according to a decrease in the hydraulic pressure to allow the gasket to make close contact with the container body and the lid.

* * * * *